Aug. 11, 1964        N. E. McIVER ETAL        3,144,645
                     DISTANCE MEASURING SYSTEM
Filed April 21, 1960                          3 Sheets-Sheet 1

NORMAN E. McIVER
GORDON A. LEAP
ROBERT W. COPE
INVENTORS

BY
*Killman and Kerst*
ATTORNEY

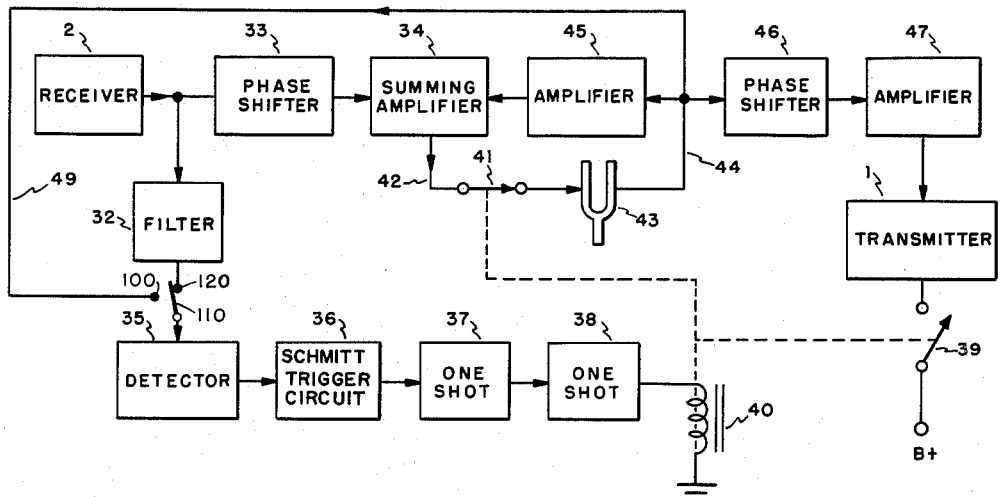
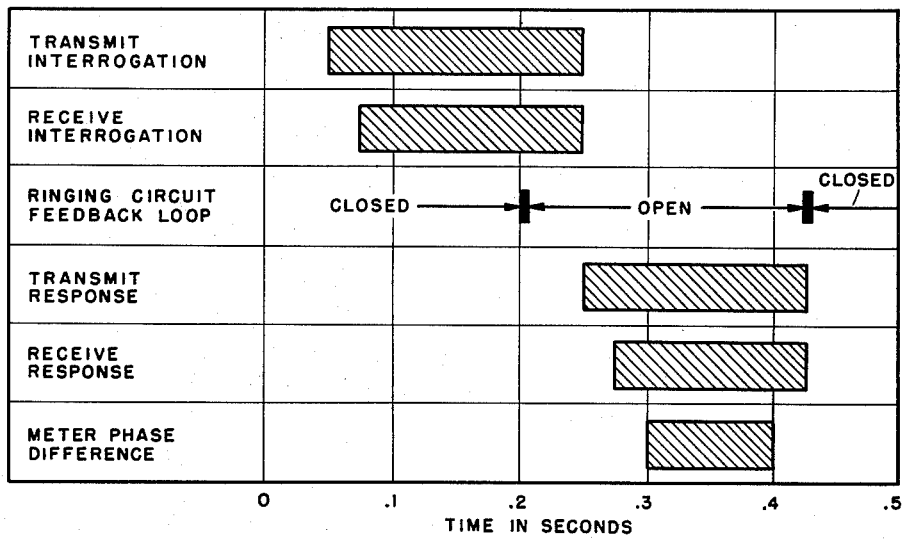
Fig. 3
Fig. 4

NORMAN E. McIVER
GORDON A. LEAP
ROBERT W. COPE
INVENTORS

United States Patent Office 3,144,645
Patented Aug. 11, 1964

3,144,645
DISTANCE MEASURING SYSTEM
Norman E. McIver, Baltimore County, Gordon A. Leap, Baltimore, and Robert W. Cope, Baltimore County, Md., assignors to The Bendix Corporation, a corporation of Delaware
Continuation of abandoned application Ser. No. 734,566, May 12, 1958. This application Apr. 21, 1960, Ser. No. 23,810
20 Claims. (Cl. 343—12)

This is a continuation of U.S. application Ser. No. 734,566, filed May 12, 1958, now abandoned.

This invention relates to the measurement of distance between two stations by the cooperative use of radiant energy communication apparatus.

For many years attempts have been made to devise such a system which would provide accurate distance information without requiring the addition of expensive and complex equipment to the communication apparatus normally carried by aircraft.

One of the typical early versions of systems of this type is disclosed by U.S. Patent No. 2,134,716 to Gunn, issued November 1, 1938. This patent proposes to measure the distance between two stations by transmitting a radio frequency wave from the first station, receiving it at the second station, retransmitting a wave at the second station in response to this reception, receiving the retransmitted wave at the first station and determining the distance by measuring the time between the initiation and return pulses or by comparing modulation phase of the original and the retransmitted waves.

A major problem which occurs when arrangements of this type are used, is that of interference between the original and the retransmitted waves at the first or interrogating station. The patent adopts two solutions for this problem which have been utilized as standard solutions by later workers in this field. In the system shown in FIG. 1 of the patent, the retransmitted carrier frequency is different from that of the original wave. In the system shown in FIG. 2 the signal is of a pulse type and the received signal at the second station is delayed before being retransmitted.

While both of these expedients prevent interference, they introduce complications into the system which have prevented the development of practical inexpensive distance measuring equipment using ordinary communication apparatus with which aircraft are normally supplied. To retransmit on a different frequency requires duplex communication facilities and two communication channels. These are not commonly available. The second system requires the use of radio equipment designed to handle pulse modulation sginals, and voice communication equipment does not normally have this capacity.

Among the objects of the invention are:

The provision of a system for distance determination which utilizes standard communication equipment normally carried by aircraft with simple and inexpensive additions;

The provision of such a system which permits the use of the communication equipment for normal communication purposes when not being used for distance determination; and The provision of such a system which makes economical use of the radio spectrum.

These, and other objects and advantages of the invention are realized by a system in which there is added to the transmitter and receiver comprising the normal communications equipment of an aircraft sufficient adaptive mechanism to generate and impress upon the transmitter for interrogation purposes a highly frequency stable modulation and to switch the system into a receiving condition at the end of a predetermined interrogation period. The modulation generating circuit is preferably a tuning fork driven as an oscillator.

For responding purposes there is also provided means responsive to an interrogation signal from another station to acquire and store a memory of the modulation phase of the received signal in a circuit having prior knowledge of modulation frequency and, after a period of time, to impress this frequency upon the transmitter for a limited time. This means is a ringing circuit including a tuning fork, which is preferably also used as an oscillator to drive the modulator mentioned above. In order that the phase information of the incoming signal may be easily and accurately acquired by this ringing circuit a negative feedback is applied to the tuning fork during reception to lower the Q of the tuning fork, and this feedback circuit is interrupted after allowing time for the build up of oscillation in phase with the received signal, restoring the Q of the latter to the high value needed for accurate memory purposes.

A flip-flop type phase meter is employed, to which the output of the modulating oscillator and the receiver are applied for comparison.

In the drawings:

FIG. 3 is a block diagram showing the components of the system utilized in a station which is responding;

FIG. 4 is a timing diagram for the operation of the system; and

Figure 1:
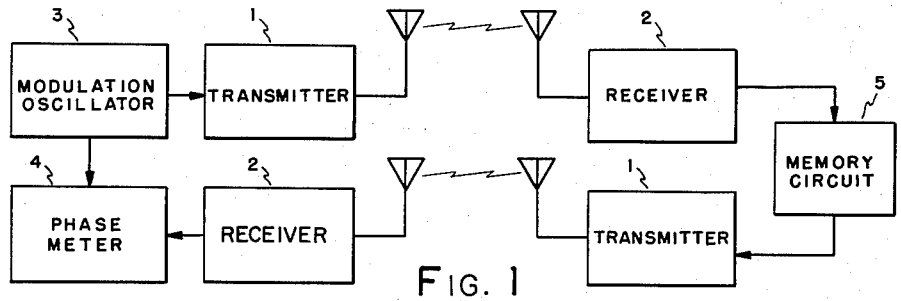
FIG. 1 is a block diagrammatic showing of the general arrangement of a system embodying the invention.

The system according to the invention basically involves the elements shown in FIG. 1 in which each station is equipped with a transmitter 1 and a receiver 2. These may be the communication devices normally installed in an aircraft.

The left hand portion of the system as shown in this figure is acting as the interrogator and for the purpose utilizes a modulation oscillator 3, the output of which is applied both to the transmitter 1 and to a phase meter 4. The output of the receiver is also applied to the phase meter.

In the responding station the output of the receiver 2 is applied to a memory circuit 5. As will be explained later, the memory circuit uses a tuning fork as a ringing device.

Figure 2:
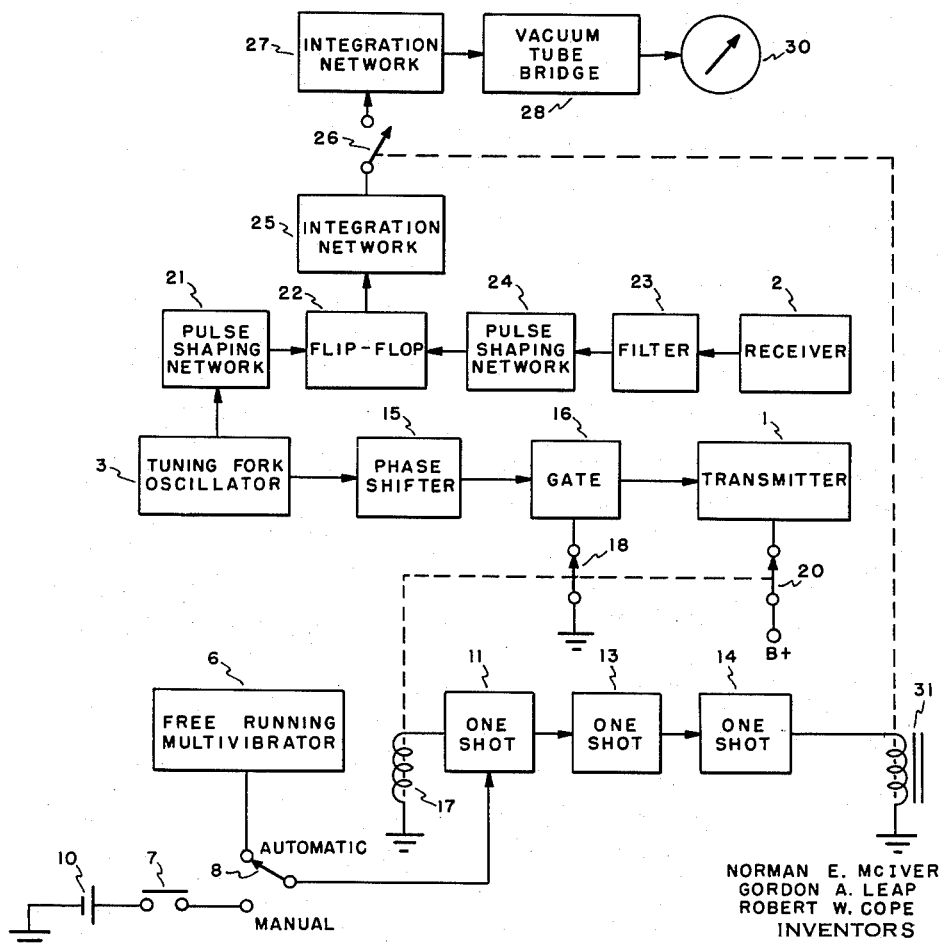
FIG. 2 is a block diagram showing the components of the system utilized in a station which is interrogating.

FIG. 2 shows an interrogating station conforming to the invention. The system is arranged so that either automatic or manual interrogation may be employed. For automatic interrogation a free running multivibrator 6 is provided. For manual operation a pushbutton type switch 7 is provided to complete a circuit through a power source to the lower contact of switch 8. The free running multivibrator 6 or the power source 10 provide triggering impulses to a one shot multivibrator 11. The output of this multivibrator is applied as triggering voltage to a second one shot multivibrator 13, the output of which is likewise used for triggering a third one shot multivibrator 14. The outputs of these multivibrators are used also in a manner which will be later described to actuate relays controlling switches to carry out the timing program of the station in its interrogation function.

The output of the modulation oscillator 3 is applied by way of a phase shifter 15 and a gating circuit 16 to the transmitter 1. The oscillator 3 utilizes a tuning fork as the frequency determining means for reasons which will be pointed out later. The output of one shot multivibrator 11 is applied to a relay 17 which actuates a switch 18 for controlling the conductivity of the gating circuit 16 and a switch 20 for keying the transmitter 1.

The output of tuning fork oscillator 3 is also applied by way of a pulse shaping network 21 to a flip-flop multivibrator 22. The output of receiver 2 is also applied to this multivibrator by way of a filter circuit 23 and a pulse shaping network 24.

The output of flip-flop multivibrator 22 is applied to an integration network 25, the output of which is applied by way of a single pole, single throw switch 26 to a second integration network 27. The output of network 27 is applied by way of a vacuum tube bridge 28 to a D.C. meter 30. The switch 26 is controlled by a relay 31 actuated by the output of one shot multivibrator 14.

In the operation of the system of FIG. 2, the generation of an interrogating impulse is triggered by an impulse either from the free running multivibrator 6 or from the power source 10 through pushbutton 7 to the one shot multivibrator 11. The output of this circuit closes switches 18 and 20, activating the gating circuit and keying the transmitter 1. The output of the tuning fork oscillator 3, which is in continuous operation from the time the apparatus is energized in the configuration of an interrogator, is thus applied to the transmitter for the duration of the output pulse of the multivibrator 11. The phase shifter 15 is present for calibration purposes to nullify the fixed phase shift characteristic of the associated transmitter and receiver. The metering circuit comprising elements 22 to 28, inclusive, and 30 is not yet complete, since the switch 26 is open.

Upon the receipt of a response by the receiver 2, its output is applied by way of filter 23 and pulse shaping network 24 to the flip-flop 22. At about this time the multivibrator 14 will close the switch 26 through the action of relay 31 and the metering circuit will be in functioning condition. The pulse from the tuning fork oscillator having been shaped in network 21 acts as a triggering pulse to turn on the flip-flop 22. The pulse from the receiver having been shaped in network 24 acts as a triggering impulse to turn off the flip-flop 22. Thus, the duration of the output pulse of the flip-flop 22 is proportional to the distance between the interrogating and responding stations.

The output of network 25 and network 27, being applied to the vacuum tube bridge circuit 28, produces an indication on the D.C. meter 30 which is proportional to the duration of the output pulses of the flip-flop 22.

FIG. 3 shows the arrangement of a responding station in accordance with the invention. The output of the receiver 2 is applied by way of a filter 32 through contact 120 of a switch 110 to a detector 35. Alternatively, the output may be applied directly from conductor 44, the tuning fork serving as a filter, by way of conductor 49 and contact 100 of switch 110. The output of the detector, which is the envelope of the interrogation signal, is applied to a Schmitt trigger circuit 36, the output of which triggers a one shot multivibrator 37. The output of this multivibrator is applied to a second one shot multivibrator 38. The output of one shot multivibrator 38 is utilized to deenergize a normally energized relay 40. The relay 40 controls a normally closed single pole, single throw switch 41 located in a connection 42 which applies the output of the summing amplifier 34 to drive a tuning fork 43, and a normally open single pole, single throw switch 39 in the power supply connection of the transmitter 1. The output of the tuning fork 43 is applied through a conductor 44 to an amplifier 45 and also by way of a phase shifter 46 and an amplifier 47 to the transmitter 1, where it is utilized as modulating voltage. The output of amplifier 45 is applied to the summing amplifier 34.

In the operation of the circuit the output of receiver 2, consisting of interrogation pulses from a station such as that shown in FIG. 2, is applied by way of phase shifter 33 to the summing amplifier 34. The phase shifter 33 is present for adjusting purposes. This output is also applied to a detector 35. The output of detector 35 is applied to the chain of circuits 36, 37 and 38, the sequential operation of which develops a delayed signal in response to which the relay 40 operates to open the switch 41 and close the switch 39. The output of the summing amplifier 34 is applied through conductor 42 and switch 41 to drive the tuning fork 43. The output of tuning fork 43 is applied by amplifier 45 to the summing amplifier 34, where it acts in a degenerative sense on the signal which has been applied from the receiver 2.

Upon the deenergization of relay 40 and the opening of switch 41 the tuning fork 43 is allowed to ring freely, its output now being applied as modulating voltage to the transmitter 1.

FIG. 4 shows a series of graphs drawn to the same time scale which illustrate the time of occurrence and the durations of the various events which make up a cycle of interrogation and response in the use of the system depicted in FIGS. 2 and 3. The shaded areas indicate the various events. With an interrogation pulse beginning at .05 second on the scale and lasting for two-tenths of a second it will be noted that the reception of the pulse at the responding station occurs a short time after the beginning of the interrogation pulse and terminates at the same time as the interrogation pulse. The delay in the beginning of the reception is due almost solely to the action of the AGC circuit of the receiver which may take some time to settle down. The initiation of the interrogation pulse is effected by the operation of the relay 17 of FIG. 2 and its termination coincides with the trailing edge of the output pulse of the one shot multivibrator 11.

With respect to the operation of the ringing circuit feedback loop, it is evident from the graphs that this circuit remains closed for a considerable part of the duration of the received interrogation pulse and is then opened by the action of relay 40 allowing the tuning fork to ring freely for the duration of the transmitted response. The transmitter is activated by the operation of the same relay through the closing of the switch 39. However, the warm up time of the transmitter delays its operation. When it becomes operative it transmits a responsive signal until deactivated by the termination of the signal of the multivibrator 38. The phase meter indication is initiated in the interrogating station by the action of the relay 31 in closing the switch 26 and the influence on the meter is terminated by the opening of the switch 26 at the terminal edge of the output signal of the multivibrator 14, the integrator 30 maintaining the indication for some time thereafter.

The ringing circuit incorporating the tuning fork 43 in the responding station of FIG. 3 thus acts as a memory circuit, since the tuning fork continues to ring with great fidelity at its resonant frequency throughout the response period after reception of the interrogating signal has ceased. The use of a tuning fork in the memory circuit and in the tuning fork oscillator of the interrogating station makes possible a very accurate tracking of frequency between the two stations with a frequency stability such that errors due to this source are reduced to a satisfactory level. Forks are available for this purpose which differ in resonant frequency by less than ninety parts per million and have Q's of approximately ten thousand. A Q of this magnitude is essential to the maintenance of good frequency stability. However, a low Q is required in order for the fork to quickly and accurately accept phase information in response to a received interrogation signal.

The tuning fork used in the memory circuit is made in accordance with this invention to appear as a low Q device during the major portion of the reception of an interrogation signal by the use of negative feedback through the amplifier 45 and the summing amplifier 34 during the time that the switch 41 is closed. Upon the opening of this switch the high Q necessary to frequency stability is reestablished with the fork vibrating freely.

Figure 5:
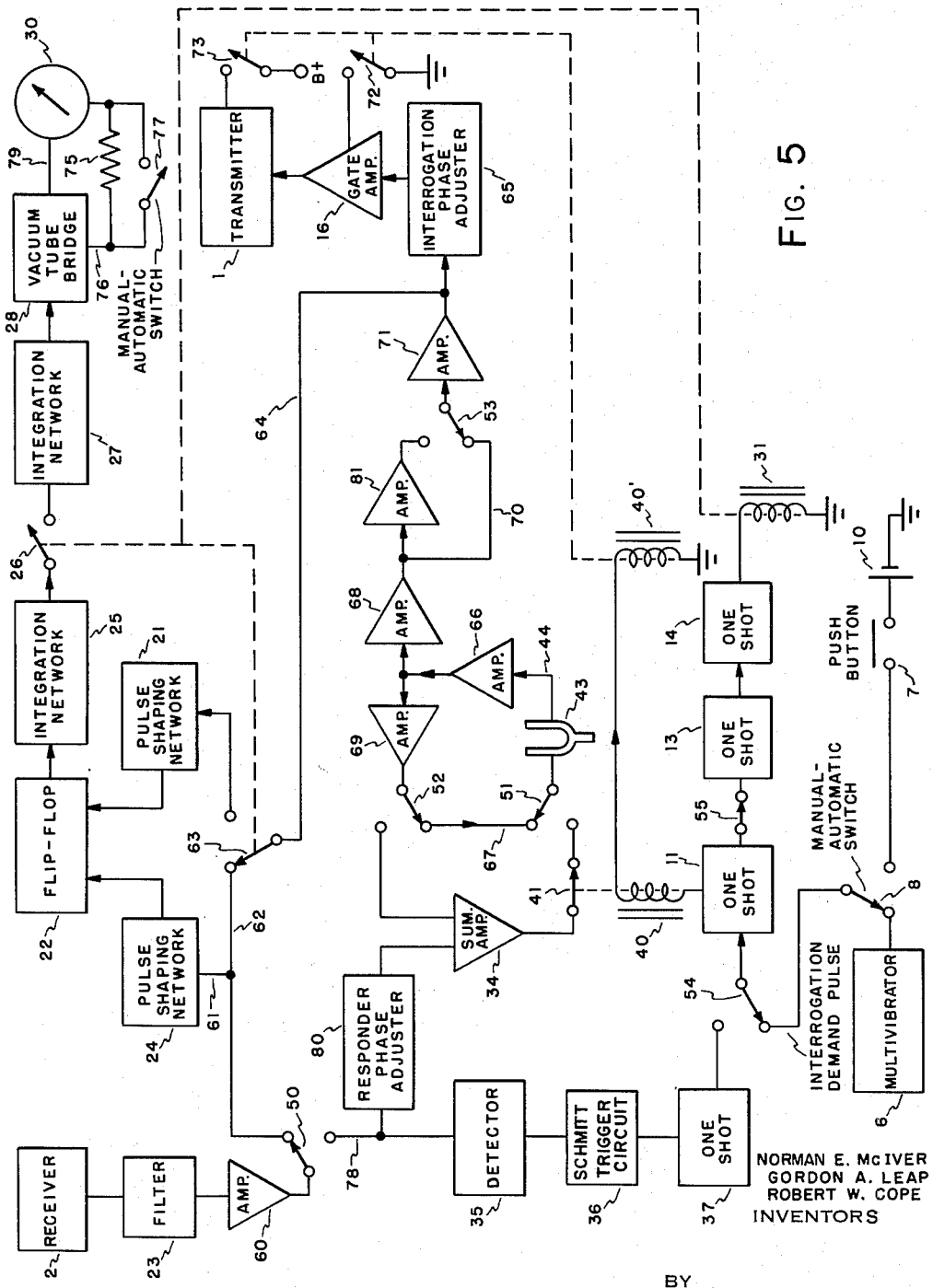
FIG. 5 is a block diagram of the system as a whole showing the switching arrangement which enables the station to utilize certain components for both interrogating and responding functions.

FIG. 5 shows a system capable of being used for interrogation purposes in the same manner as the circuit of FIG. 2 and also capable of being used as a responding station in accordance with the disclosure of FIG. 3. In this system the elements common to both functions of the system, such as the transmitter 1 and the receiver 2, are utilized, together with a plurality of switches which operate to set the system up for either interrogation or response. The switches utilized for this purpose are indicated by numerals 50, 51, 52, 53, 54 and 55. All of these, except switch 55, are of the single pole, double throw variety, while 55 is a single pole, single throw switch. These switches are all shown in position for interrogation.

The receiver 2 and filter 23 are shown as followed by an amplifier 60, the output of which is connected to the switch 50. In the interrogating position this switch connects the output of amplifier 60 through a lead 61 to the pulse shaping network 24 of the metering circuit. With the switches 51 and 52 in the position shown, the tuning fork 43 is included in a circuit comprising a conductor 44, an amplifier 66, an amplifier 69, and a conductor 67. This circuit constitutes the tuning fork oscillator 3 shown in FIG. 2. The output of this amplifier is applied by way of an amplifier 68, a lead 70, switch 53, an amplifier 71, a phase adjuster 65, and the gate amplifier 16 to the transmitter 1. The output of the amplifier 71 is also applied by way of a conductor 64, a switch 63, a conductor 62, and a conductor 61 to the pulse shaping network 24. The purpose of this latter connection is to establish the output level of the interrogation network 25 at a value equivalent to zero range during the period before a response is received from a responding station.

Either the multivibrator 6 or the pushbutton switch 7 is connected by the switch 8 and switch 54 to the chain of one shot multivibrators 11, 13 and 14. The output of the multivibrator 11 is applied to a relay winding shown here in two parts 40 and 40', in order to simplify the drawing. The winding 40 is shown as controlling the operation of the normally closed switch 41 and the winding 40' is shown as controlling the operation of a normally open switch 72 which governs the activation of gate amplifier 16 and a normally open switch 73 which performs the same function for the transmitter 1. The relay winding 31 controls the operation of switch 63 and switch 26.

In the metering circuit the output of the vacuum tube bridge 28 is applied to a series circuit comprising a conductor 79, the indicator 30, a resistor 75, and a conductor 76. Connected across the resistor 75 is a short-circuiting switch 77. The purpose of this latter switch is to alter the sensitivity of the indicator circuit for the two conditions of manual and automatic operation of the interrogation system. Different meter sensitivity is required for the two modes of operation because the meter voltage does not quite reach the average flip-flop output voltage and the discrepancy between the metered voltage and the average flip-flop output voltage differs in the two modes of operation, and thus a difference in meter sensitivity is required.

In the operation of the system in the interrogation condition, the tuning fork oscillator 3 of FIG. 1 may be initially in operation. No transmission is effected, however, since the gating amplifier and the transmitter 1 are both in an inactive state. Upon the application of an interrogation demand pulse from the multivibrator 6 of FIG. 5 or the power source 10 through the pushbutton 7, the one shot multivibrator 11 is triggered.

The output of the multivibrator 11, acting to deenergize the normally energized windings 40 and 40', will open the switch 41 and close the switches 72 and 73. The operation of the switch 41 is of no consequence to the interrogation action, since the summing amplifier 34 is not connected to the tuning fork circuit. However, the operation of the switches 72 and 73 will activate the gate amplifier 16 and key the transmitter 1. This will initiate the transmission of a pulse from the transmitter 1, modulated with the output of the tuning fork oscillator 3, which will terminate when the one shot multivibrator 11 reverts to its normal quiescent state.

The output of the multivibrator 11 also being applied to the multivibrator 13, triggers that circuit and its output triggers the multivibrator 14. By this time the transmission of the interrogation pulse will have terminated. The output of the multivibrator 14, acting on the relay winding 31, will now close the switch 26 to activate the metering circuit and shift switch 63 to its right hand position. This applies the output of the amplifier 71 to the pulse shaping network 24.

Upon the receipt of a response from a responding station by the receiver 2, the output of this receiver, as acted upon by the filter 23 and amplifier 60, is applied by the lead 61 to the pulse shaping network 24.

For the use of the system of FIG. 5 as a responding station the switches 50, 51, 52, 53, and 54 are shifted to their alternative positions and the switch 55 is opened. With the switch 50 in its new position the output of amplifier 60 is applied by a conductor 78 to a sequence of circuits comprising the detector 35, Schmitt trigger circuit 36, one shot multivibrator 11. The output of amplifier 60 is also applied to a phase adjuster 80, the output of which is applied to the summing amplifier 34. The switch 41 is closed and with the switches 51 and 52 in their new positions, the output of summing amplifier 34 is connected through the switch 41 and the switch 51 to drive the tuning fork 43. The output of the amplifier 69 is also applied to the summing amplifier 34 by way of switch 52 in its new position. With the switch 53 in its new position an amplifier 81 is inserted between the amplifiers 68 and 71.

In the operation of the system of FIG. 5 as a responding station, the output of the receiver 2, as acted upon by the filter 23 and amplifier 60, is applied through the phase adjuster 80 to the summing amplifier 34. The output of this amplifier drives the tuning fork 43. The degenerative feedback circuit from the output of the tuning fork through the conductor 44, amplifier 66, and amplifier 69 to summing amplifier 34, where it acts in a degenerative sense, reduces the Q of the tuning fork, thus allowing it to readily respond and quickly build up to maximum amplitude in response to the received interrogation signal.

The output of amplifier 60 is also applied to the sequence of circuits 35, 36, 37 and 11. The circuits 36, 37 and 11 sequentially trigger each other and the output of circuit 11 is applied to the windings 40 and 40'. The winding 40', upon being deenergized, opens the switch 41 and closes the switches 72 and 73 to render the gating amplifier 16 conductive and to key the transmitter 1. With the opening of the switch 41 the feedback circuit associated with the tuning fork 43 is interrupted, allowing the Q of the fork to return to its normal high value and causing the fork to continue to vibrate at the interrogation frequency as a memory element. As soon as the transmitter 1 builds up to its operating state the wave generated by the vibration of the tuning fork, and as amplified by the amplifiers 66, 68 and 71, will be applied by way of the gating amplifier 16 and transmitted by the transmitter 1 as an interrogation response. When the one shot multivibrator 11 returns to its quiescent state the transmitter will be deactivated by means of the switch 73 and the switch 41 will return to its closed position.

We claim:

1. A system for measuring the distance between a pair of stations, one of said stations comprising a transmitter and a receiver operative on the same frequency, a highly frequency stable modulation oscillator and a phase meter, means modulating the output of said transmitter with the output of said oscillator, means for keying said transmitter to cause the same to emit a pulse of energy, and means applying the outputs of said oscillator and said receiver to said phase meter following the termination of said transmitted pulse, and the other of said stations comprising a receiver and a transmitter operative on the same frequency as those of said one station, a memory circuit having the same order of frequency stability as said oscillator, means applying the output of the last named receiver to said memory circuit to store the detected modulation, means applying the output of said memory circuit to said last named transmitter to modulate the same and means keying the same following the termination of the reception of a pulse of energy from said one station to cause said last named transmitter to emit a pulse of energy.

2. A system for measuring the distance between a pair of stations, one of said stations comprising a transmitter and a receiver operative on the same frequency, a highly frequency stable modulation oscillator and a phase meter, means modulating the output of said transmitter with the output of said oscillator, means for keying said transmitter to cause the same to emit a pulse of energy, and means applying the outputs of said oscillator and said receiver to said phase meter following the termination of said transmitted pulse, and the other of said stations comprising a receiver and a transmitter operative on the same frequency as those of said one station, a memory circuit having the same order of frequency stability as said oscillator, means applying the output of the last named receiver to said memory circuit to store the detected modulation, means applying the output of said memory circuit to said last named transmitter to modulate the same and means keying the same following the termination of the reception of a pulse of energy from said one station to cause said last named transmitter to emit a pulse of energy, said modulation oscillator and said memory circuit each including a tuning fork, said tuning forks being resonant at the same frequency, and establishing the output modulation frequencies of their respective circuits.

3. A system for measuring the distance between a pair of stations, one of said stations comprising a transmitter and a receiver operative on the same frequency, a first electromechanical resonator, means driving said resonator as an oscillator, a phase meter, means modulating the output of said transmitter with the output of said oscillator, means for keying said transmitter to cause the same to emit a pulse of energy, and means applying the outputs of said oscillator and said receiver to said phase meter following the termination of said pulse, and the other of said stations comprising a receiver and a transmitter operative on the same frequency as those of said one station, a second electromechanical resonator identical in frequency with said first resonator, means applying the output of the last named receiver to said second resonator to excite the same to oscillation, means applying the output of said second resonator to said last named transmitter to modulate the same and means keying the same following the termination of the reception of a pulse of energy from said one station to cause said last named transmitter to emit a pulse of energy.

4. A system for measuring the distance between a pair of stations, one of said stations comprising a transmitter and a receiver operative on the same frequency, a first electromechanical resonator, means driving said resonator as an oscillator, a phase meter, means modulating the output of said transmitter with the output of said oscillator, means for keying said transmitter to cause the same to emit a pulse of energy, and means applying the outputs of said oscillator and said receiver to said phase meter following the termination of said pulse, and the other of said stations comprising a receiver and a transmitter operative on the same frequency as those of said one station, a second electromechanical resonator identical in frequency with said first resonator, means applying the output of the last named receiver to said second resonator to excite the same to oscillation, means reducing the Q of said second resonator during at least a portion of the interval of application of the output of said last named receiver thereto, means applying the output of said second resonator to said last named transmitter to modulate the same and means keying the same following the termination of the reception of a pulse of energy from said one station to cause said last named transmitter to emit a pulse of energy.

5. A system for measuring the distance between a pair of stations, one of said stations comprising a transmitter and a receiver operative on the same frequency, a first electromechanical resonator, means driving said resonator as an oscillator, a phase meter, means modulating the output of said transmitter with the output of said oscillator, means for keying said transmitter to cause the same to emit a pulse of energy, and means applying the outputs of said oscillator and said receiver to said phase meter following the termination of said pulse, and the other of said stations comprising a receiver and a transmitter operative on the same frequency as those of said one station, a second electromechanical resonator identical in frequency with said first resonator, means applying the output of the last named receiver to said second resonator to excite the same to oscillation, means to complete a negative feedback path around said second resonator and to maintain the same throughout a substantial portion of the application of said output to said second resonator, means applying the output of said second resonator to said last named transmitter to modulate the same and means keying the same following the termination of the reception of a pulse of energy from said one station to cause said last named transmitter to emit a pulse of energy.

6. In a system of the class described, a distance measuring station comprising a normally deactivated transmitter and a receiver of identical frequencies, a normally deactivated phase meter, an electromechanical resonator resonant at a frequency lower than that of said transmitter, means for operating said transmitter, receiver, phase meter and resonator to act as an interrogating station, the last named means comprising a source of pulse signals, means for completing a positive feedback path around said resonator, means connecting the output of said resonator to said transmitter, means connecting the output of said receiver to said phase meter, means responsive to one of said pulse signals to activate said transmitter after a first delay and to connect the output of said resonator to said phase meter and to activate said phase meter after a second delay, and means for operating said receiver, transmitter and resonator as a responding station comprising means to apply the output of said receiver to said resonator, means to interrupt said positive feedback path around said resonator and to establish a negative feedback path therearound and means responsive to the output of said receiver to interrupt said negative feedback path and to activate said transmitter after a delay.

7. In a distance measuring system having a station including a transmitter and receiver of identical frequencies and means for comparing the modulation phase of transmitted and received signals, an electromechanical resonator having its output applied to said transmitter as modulation voltage, means for forming a positive feedback path around said resonator when said station is interrogating and means for using said station for responding purposes comprising means applying the output of said receiver to said resonator, means for interrupting said positive feedback path and establishing a negative feedback path around said resonator and means responsive to the output of said receiver to interrupt said negative feedback path after a delay.

8. In a distance measuring system a local station comprising a first stable high-Q electromechanical resonator, means for driving said resonator to generate a modulation frequency and a transmitter operable for transmission of said modulation frequency; a remote responder for receiving said transmission and recovering said modulation frequency, a second stable high-Q electromechanical resonator similar to said first resonator and having identical resonant frequency, means for driving said second resonator with said recovered modulation frequency, and means operable for retransmission of the modulation frequency from said second resonator, a receiver at said local station for receiving said retransmission and recovering said modulation frequency, means operable for comparing the phase difference between said modulation frequency recovered by said receiver and the frequency generated by said first resonator and indicating said difference in terms of distance between said local station and said remote responder; and means for intermittently actuating said transmitter, said retransmission means and said means for comparing and indicating phase difference being actuated during intervals between the actuation of said transmitter.

9. In a distance measuring system a local and a remote station, said local station having a transmitter, a receiver, a modulation generator, a phase comparator and an indicator responsive to the output of said phase comparator; said remote station having a receiver tuned to the transmission frequency from said local station, a storage element capable of storing the modulation frequency detected by said receiver and a transmitter modulated by the frequency stored in said storage element; means for operating said transmitter at said local station to transmit the frequency of said modulation generator, means for operating said receiver at said local station to detect the frequency stored by said storage means and transmitted by said remote station, and means for applying to said phase comparator the frequency of said modulation generator and the stored frequency detected by said receiver.

10. A system for measuring distance between a first point and a second point comprising at said first point means for generating a phase reference wave of fixed frequency, a radio transmitter modulated by said wave, means at said second point for receiving the signal from said first point and recovering the modulation wave therefrom, storage means at said second point for storing with fixed frequency and phase said recovered modulation wave, means at said second point for transmitting to said first point a signal modulated by the stored wave from said storage means, a receiver at said first point for receiving the signal transmitted from said second point and recovering the modulation component thereof, phase comparing means for producing an output signal in accordance with the phase difference between said modulation component and said phase reference wave generated at said first point, and means responsive to said output signal.

11. Apparatus according to claim 10 in which said means for generating said phase reference wave is an oscillator having the frequency of oscillation determined by a first high-Q electromechanical resonator and in which said storage means is a second high-Q electromechanical resonator substantially identical in frequency with said first resonator.

12. Apparatus according to claim 11 in which said resonators are tuning forks having a Q of the order of 10,000 or greater.

13. An interrogator for a distance measuring system comprising an audio modulation tone oscillator, a high-Q electromechanical resonator for stabilizing said tone oscillator, a transmitter modulated by said tone, a receiver, a phase comparator, means for applying to said phase comparator said tone and the modulation recovered by said receiver, means for indicating distance in response to the phase difference determined by said phase comparator and means for selectively operating said transmitter and receiver upon the same carrier frequency for interrogating and obtaining a response from a remote responder station.

14. An interrogator for a distance measuring system comprising an audio modulation tone oscillator stabilized by a high-Q electromechanical resonator, a transmitter, means for modulating said transmitter by said tone, selective means for operating said transmitter to transmit said tone modulation for a first interval, a receiver, a phase comparator, means for indicating distance in response to the phase difference determined by said phase comparator, means responsive to the end of said first interval for introducing a delay of a second interval, and means responsive to the end of said second interval for actuating for a third interval said receiver, said comparator and said indicator, said comparator comparing the phase of modulation detected by said receiver with the phase of the tone derived from the oscillation of said resonator to produce an indication of the distance to a responder station to which said transmitter and receiver are tuned.

15. Apparatus according to claim 14 in which said transmitter and receiver are tuned to the same carrier frequency.

16. A responder for a distance measuring system comprising a receiver, an electromechanical resonator resonant at an audio modulation frequency employed to interrogate said responder, an exciting circuit for driving said resonator with the modulation detected by said receiver, a negative feedback loop around said resonator for substantially lowering the Q of said resonator, a transmitter, and means responsive to said detected modulation in said receiver for interrupting said feedback loop and modulating said transmitter by the free audio oscillations of said resonator to transmit said oscillations.

17. Apparatus according to claim 16 in which said receiver and said transmitter are tuned to the same carrier frequency.

18. A distance measuring equipment selectively operable as an interrogator or responder comprising an audio modulation tone oscillator having a frequency determined by a high-Q electromechanical resonator connected in a positive feedback loop in said oscillator, a transmitter, means for modulating said transmitter by said tone, first selective means operable for operating said transmitter to transmit said tone modulation for a first interval, a receiver, a phase comparator, means for indicating distance in response to the phase difference determined by said phase comparator, means responsive to the end of said first interval for introducing a delay of a second interval, means responsive to the end of said second interval for actuating for a third interval said receiver, said comparator and said indicator said comparator comparing the phase of modulation detected by said receiver with the phase of the tone derived from the oscillation of said resonator to produce an indication of the distance to a responder station to which said transmitter and receiver are tuned, second selective means operable to interrupt said positive feedback loop, to establish a negative feedback loop around said resonator and to excite said resonator with the modulation detected by said receiver, said negative feedback loop substantially lowering the Q of said resonator, and means responsive to the termination of the detected output of said receiver when applied to said negative feedback loop for interrupting said negative feedback loop and modulating said transmitter by the free audio oscillations of said resonator to transmit said oscillations.

19. Apparatus according to claim 18 in which said transmitter and receiver are tuned to the same carrier frequency and said resonator maintains the same audio frequency for all oscillating conditions of operation of said equipment.

20. The method of distance measurement between two spaced points comprising the steps of transponding between said points with a modulation frequency determined by a high-Q electromechanical resonator at the point initiating said transponding, storing at the other point said modulation frequency in a resonator of substantially the same characteristics as said high-Q electromechanical resonator, and indicating at said initiating point a quantity determined by the phase difference between the frequency of said high-Q electromechanical resonator and the stored modulation frequency received from said other point.

References Cited in the file of this patent

UNITED STATES PATENTS

| | | |
|---|---|---|
| 1,562,485 | Affel | Nov. 24, 1925 |
| 2,134,716 | Gunn | Nov. 1, 1938 |
| 2,198,113 | Holmes | Apr. 23 1940 |
| 2,248,727 | Strobel | July 8, 1941 |
| 2,470,787 | Nosker | May 24, 1949 |
| 2,489,273 | Dodington | Nov. 29, 1949 |
| 2,520,520 | Woodard | Aug. 29, 1950 |
| 2,582,971 | Dunmore | Jan. 22, 1952 |

OTHER REFERENCES

"Electronic Avigation Engineering," Sandretto, published 1958 by International Telephone and Telegraph Co., pp. 179–181.